United States Patent
LeVan

Patent Number: 6,080,043
Date of Patent: Jun. 27, 2000

[54] APPARATUS AND METHOD FOR ACHIEVING POSITIVE CROWN DURING ABS LAP

[75] Inventor: Dien LeVan, San Jose, Calif.

[73] Assignee: International Business Machines Corporation, Armonk, N.Y.

[21] Appl. No.: 09/132,373

[22] Filed: Aug. 11, 1998

[51] Int. Cl.[7] .............................. G11B 5/127; A04R 31/00
[52] U.S. Cl. ...................... 451/41; 29/603.12; 29/603.17
[58] Field of Search .................................... 360/102, 103; 451/1, 5, 41, 276, 387, 396; 29/602, 603.12, 603.16, 603.17

[56] References Cited

U.S. PATENT DOCUMENTS

| | | | |
|---|---|---|---|
| 3,499,214 | 3/1970 | Schneider . | |
| 4,010,574 | 3/1977 | Feierabend et al. | 451/276 X |
| 4,617,764 | 10/1986 | Reibakh . | |
| 5,136,445 | 8/1992 | Zak | 360/103 |
| 5,488,527 | 1/1996 | Komori et al. | 360/122 |
| 5,503,589 | 4/1996 | Wikle . | |
| 5,603,156 | 2/1997 | Biskeborn et al. . | |
| 5,713,123 | 2/1998 | Toyoda et al. | 451/5 X |
| 5,735,036 | 4/1998 | Barr et al. | 29/603.12 |

FOREIGN PATENT DOCUMENTS 60-155353  8/1985  Japan .

*Primary Examiner*—David A. Scherbel
*Assistant Examiner*—Anthony Ojini
*Attorney, Agent, or Firm*—Robert B. Martin

[57] ABSTRACT

An apparatus and method for producing a positive crown on a slider air bearing surface. The apparatus includes a reference fixture and a carrier which holds the slider and which is positioned adjacent the reference fixture. An actuator is engageable with the carrier for causing movement of the carrier relative to the reference fixture. By controlling the displacement of the actuator, the carrier can be moved back and forth relative to the reference fixture, thereby producing a positive crown on the air bearing surface of the slider by a lapping element.

2 Claims, 4 Drawing Sheets

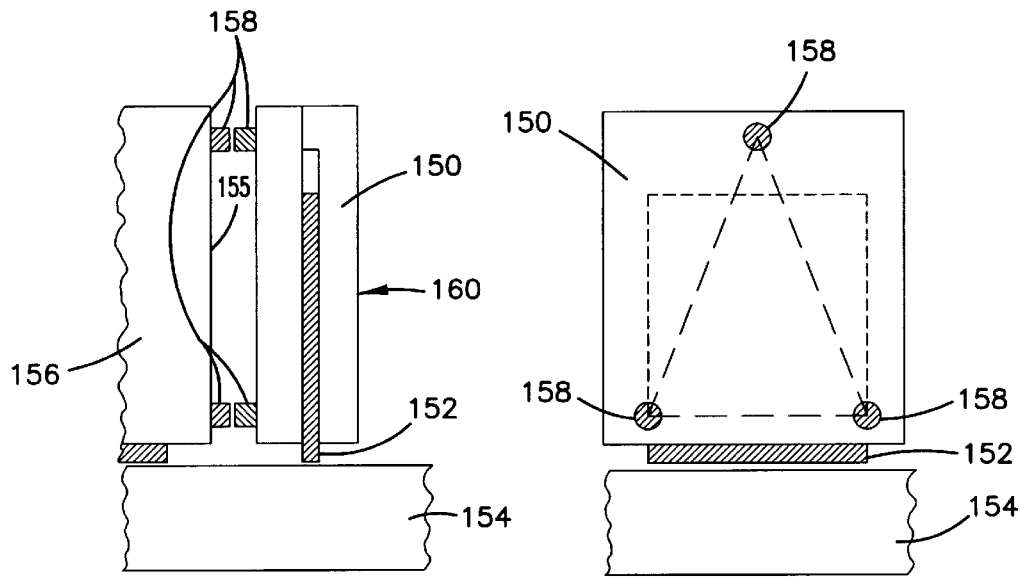
FIG. 3A – Prior Art
FIG. 3B – Prior Art
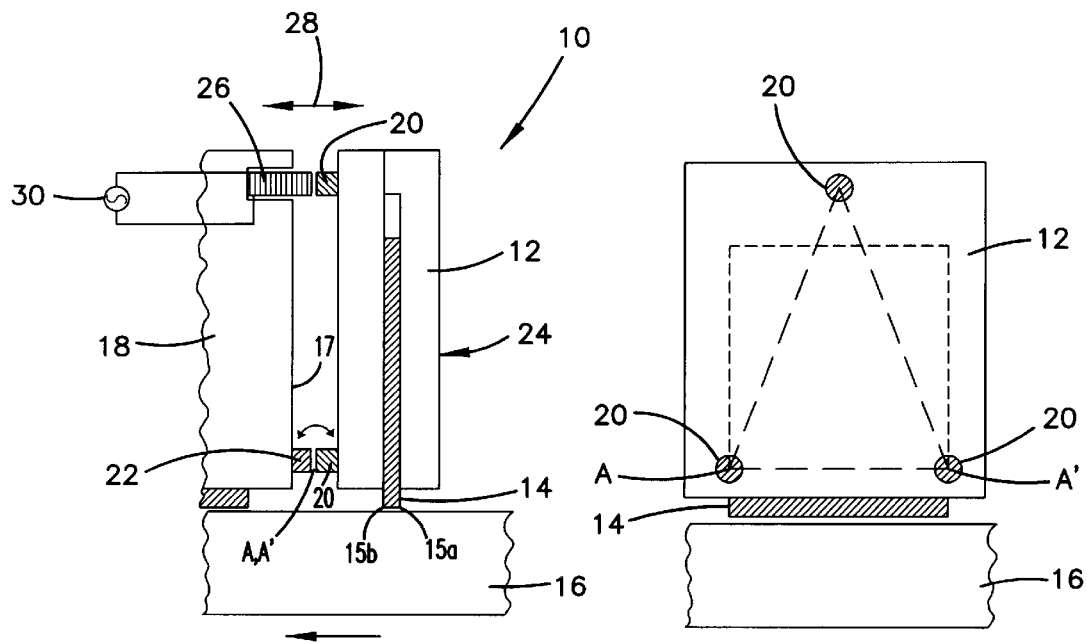
FIG. 4
FIG. 5

APPARATUS AND METHOD FOR ACHIEVING POSITIVE CROWN DURING ABS LAP

FIELD OF THE INVENTION

The invention relates to sliders for magnetic heads used in magnetic disk drive systems. More particularly, the invention relates to an improved lapping apparatus and process for producing a positive crown on slider air bearing surfaces (ABS).

BACKGROUND OF THE INVENTION

Conventional magnetic disk drives are information storage devices which utilize at least one rotatable magnetic media disk with concentric data tracks, a read/write transducer for reading and writing data on the various tracks, an air bearing slider for holding the transducer adjacent to the track generally in a flying mode above the media, a suspension for resiliently holding the slider and the transducer over the data tracks, and a positioning actuator connected to the suspension for moving the transducer across the media to the desired data track and maintaining the transducer over the data track during a read or a write operation.

The recording density of a magnetic disk drive is limited by the distance between a transducer and the magnetic media. One goal of air bearing slider design is to "fly" a slider as closely as possible to a magnetic medium while avoiding physical impact with the medium. Smaller spacings, or "fly heights", are desired so that the transducer can distinguish between the magnetic fields emanating from closely spaced regions on the disk.

An important criteria in slider fabrication is to be able to produce an ABS contour that performs well in the head/disk interface. It is known that a positive crown on the slider ABS will improve the dynamic performance of the slider, such as improving fly height and improving take-off, at the head/disk interface. A positive crown, however, is not achievable using conventional lapping apparatus and processes.

Previously, a positive crown has been achieved on air bearing surfaces by using a crown adjust process, such as sandblasting or laser scribing at the row level, after lapping of the ABS was complete. While these processes have performed reasonably well, they do have many limitations. For instance, the limited area that one can do sandblasting, especially with pico and smaller air bearings, the ABS damage due to misalignment during sandblasting, and the material properties of the slider, all tend to limit the capability of conventional crown adjust processes. These known crown adjust processes can also cause yield detractions and tend to increase slider cost.

Prior publications which are exemplary of previous techniques for contouring surfaces include Biskeborn et al., U.S. Pat. No. 5,603,156. Biskeborn et al. disclose a lapping process used on slider air bearing surfaces which minimizes electrical shorts resulting from smearing of electrically active elements at the air bearing surface. The lapping process further reduces the magnitude of recession of head elements at the air bearing surface. In one embodiment, the air bearing surface is contoured by rocking a magnetic tape recording head on a rotating lapping plate, thereby forming a curved air bearing surface. In an alternative embodiment, the magnetic tape recording head is moved across a lapping tape to produce the curved air bearing surface. However, in each of these processes, the heads are lapped individually instead of being row processed.

Published Japanese Patent Application No. 60-155,353 discloses a chamfering process in which a workpiece swings about a first axis as the workpiece is brought into engagement with rotating cutting members, including a lapping tape. Stability of the surface to be machined and improved productivity are obtained by this process.

Schneider, U.S. Pat. No. 3,499,214, discloses a process of contouring a ridge on a magnetic head by swinging the head about a first axis relative to a rotating lapping plate. The process is particularly directed toward fabricating a contact surface between the magnetic head and a magnetic storage medium.

Reibakh, U.S. Pat. No. 4,617,764, discloses a machine for contouring three dimensional surfaces of workpieces. Wikle, U.S. Pat. No. 5,503,589, discloses an apparatus for grinding and contouring gas turbine blades.

There exists a continuing need, however, for improved apparatus and techniques for contouring workpiece surfaces, particularly for producing a positive crown on a slider ABS. It would be desirable if the ABS crown was produced during lapping of the ABS, thereby eliminating the need for a separate crown adjust operation and to reduce costs, as well as allowing the selection of new slider materials which previously have been unable to used with heretofore known crown adjust processes.

SUMMARY OF THE INVENTION

In accordance with a first aspect of the invention, there is provided an apparatus for producing a crown on an air bearing surface of a slider. The apparatus includes a reference fixture, and a carrier for holding the slider, with the carrier positioned adjacent the reference fixture. An actuator is engageable with the carrier for causing movement of the carrier relative to the reference fixture.

In accordance with another aspect of the invention, there is provided a method of producing a crown on an air bearing surface of a slider. The method comprises the steps of mounting the slider in a carrier such that the air bearing surface of the slider faces a lapping element, positioning the carrier adjacent to a reference fixture, and moving the carrier back and forth relative to the reference fixture as the air bearing surface contacts the lapping element. In this manner, a crown is produced on the air bearing surface.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent like corresponding parts throughout:

FIGS. 3A and 3B are side and rear views, respectively, of an apparatus used in a known lapping process.

FIG. 4 is a side view of the apparatus used in the crown producing process of the invention.

FIG. 5 is a rear view of the apparatus in FIG. 4.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
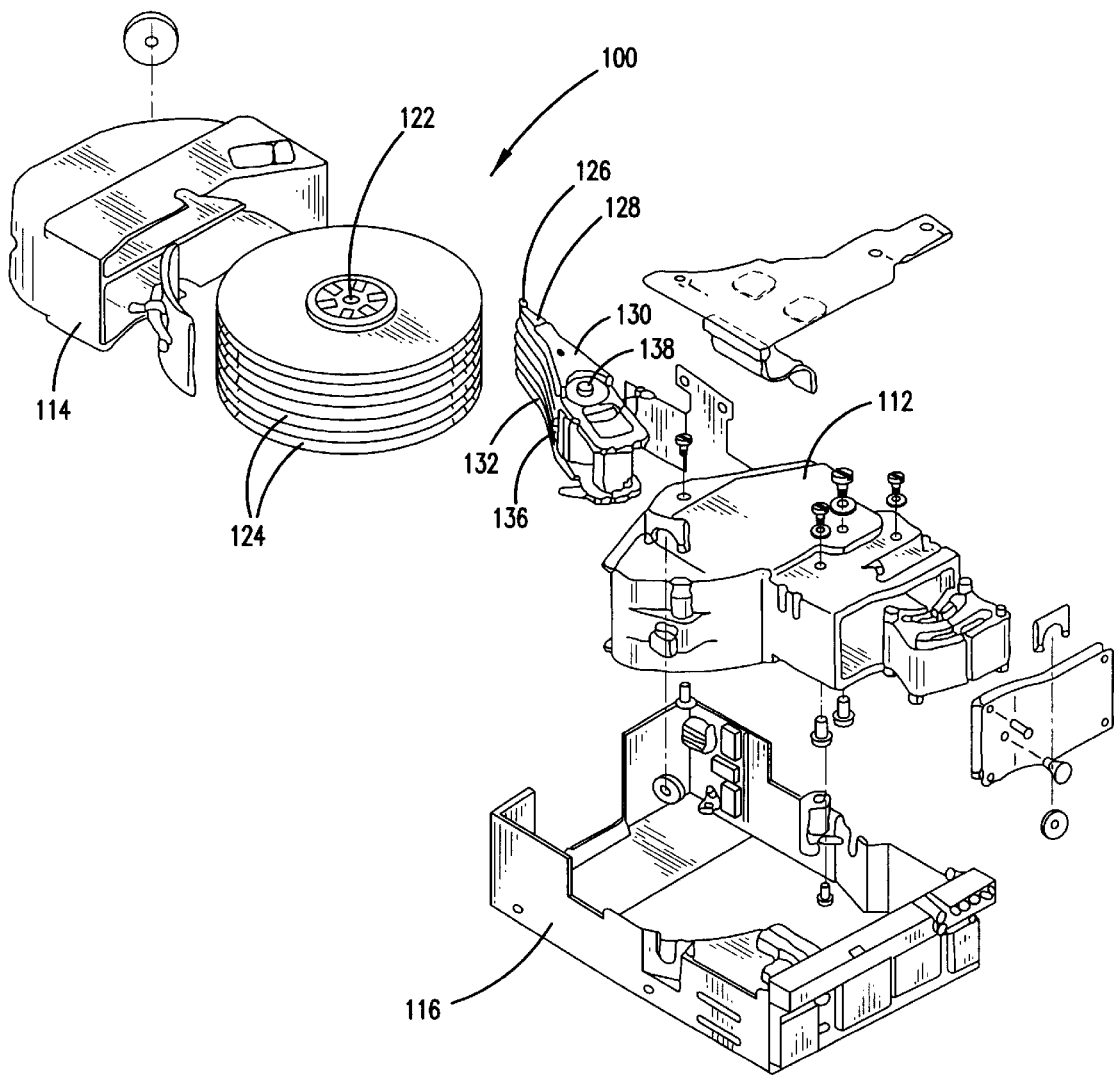
FIG. 1 is an exploded perspective view of an exemplary hard drive assembly including a slider.

Generally the apparatus and method of the invention described herein may be used to produce a positive crown on an air bearing surface of any slider used in the hard drive assembly (HDA) in computing systems common in the industry. As background, an exemplary HDA may be seen in FIG. 1 which is an exploded view of a disk drive 100. The disk drive 100 includes a housing 112 and a housing cover 114 which, after assembly, is mounted within a frame 116. Mounted within the housing is a spindle shaft 122. Rotatably attached to the spindle shaft 122 are a number of disks 124. In FIG. 1, eight disks 124 are attached to the spindle shaft 122 in spaced apart relation. The disks 124 rotate on spindle shaft 122 which is powered by a motor.

Information is written on, or read from, the disks 124 by heads or magnetic transducers which are supported by sliders 126. Preferably, sliders in accordance with the invention are coupled to suspensions or load springs 128. The load springs 128 are attached to separate arms 130 on an E block or comb 132. The E block or comb 132 is attached at one end of an actuator arm assembly 136. The actuator arm assembly 136 is rotatably attached within the housing 112 on an actuator shaft 138.

Figure 2A:
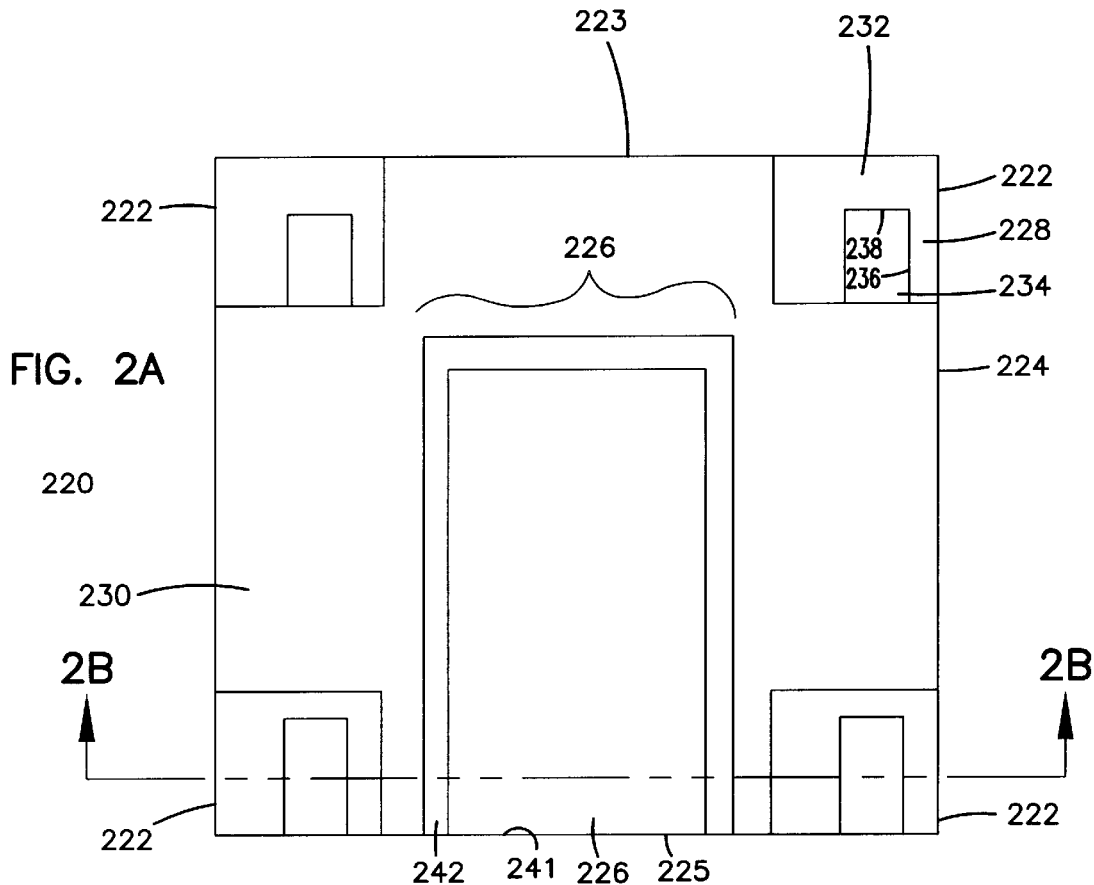
FIG. 2A is a bottom plan view of an exemplary slider.
Figure 2B:
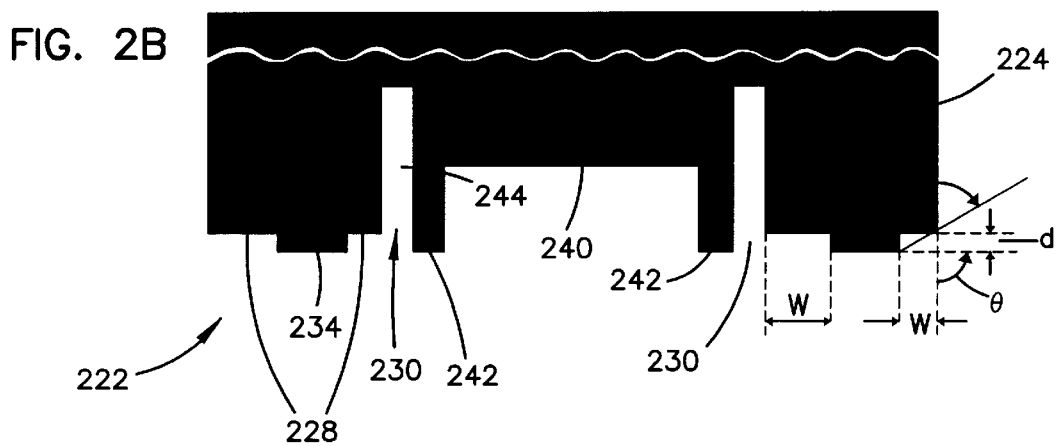
FIG. 2B is a partial cutaway view along axis B—B of the slider depicted in FIG. 2A.

To facilitate the read/write operations of the hard drive assembly, slider design can be intricate, to ensure correct and constant fly height in varying conditions. To fulfill the intended purpose of the slider, it is often patterned with various reliefs and protrusions to enhance aerodynamic character. For example, FIGS. 2A–2B illustrate a slider design 220 as disclosed in U.S. Pat. No. 5,404,256, issued Apr. 4, 1995 to James W. White, entitled "TRANSVERSE AND NEGATIVE PRESSURE CONTOUR GAS BEARING SLIDER", and which is incorporated by reference herein. The slider illustrated in FIGS. 2A–2B is designed to provide uniform and controllable fly height through a range of skew angles.

In FIGS. 2A–2B, traverse pressure contour (TPC) pads 222 are defined by a face 234 for creating a gas bearing effect, a generally U-shaped TPC section 228 including a constant depth step bearing along each side edge 236 of the face 234 and a constant depth step along the leading edge 238 forming a converging compression inlet 232. Thus, the gas bearing contour of the TPC pad 222 is defined by two parallel planes.

A negative pressure pad 226 is defined by a substantially planar surface which contains a recess 240 open at the trailing end 225. The negative pressure pad 226 may further include one or more bearing faces 242 at a height approximately that of the faces 234 of the TPC pads 222 for creating a gas bearing effect. Recess 240 is open along the trailing edge 241; that is, trailing edge 241 is substantially ambient. The ambient pressure reservoir 230 defines a cavity 244 having a depth and configuration sufficient to maintain substantial ambient pressure in the cavity during movement of the disk. Further, ambient pressure reservoir 230 includes a non-tapered (non-stepped, non-convex) inlet along leading edge 223 so as to inhibit generation of gas bearing effects created by compression of inlet gas. The apparatus and process of the invention may be used to produce a positive crown on the air bearing surfaces of this slider 220, as well as other slider designs.

A prior art lapping apparatus and process is illustrated in FIGS. 3A and 3B, where it is seen that a lapping carrier 150 holds a wafer 152 comprising a matrix of slider units arranged in a plurality of rows and columns. The wafer 152 is held in the carrier 150 in any conventional manner. The wafer 152 can contain any desirable number of rows and columns of slider units, depending upon the size of the wafer and the size of the sliders.

The particular row to be lapped extends below the lapping carrier 150 to adjacent the top surface of a lapping element 154, such as a lapping plate, tape and the like. The air bearing surfaces of the sliders in the row, face the lapping element 154. The lapping carrier 150 is held against a vertical reference surface 155 of a reference fixture 156 in a generally vertical plane. A plurality of contact pads 158 are disposed between the lapping carrier 150 and the reference fixture 156 in a triangular arrangement in order to space the carrier from the reference surface.

As seen in FIG. 3B, two pairs of the pads 158 are connected adjacent to the bottom portions of the reference surface 155 and the carrier 150, and a further pair of pads are connected adjacent to the top portions of the surface 155 and the carrier 150, thereby forming a triangle. A holding force 160, which acts along an axis that is perpendicular to the plane of the triangle defined by the contact pads 158, is applied to the lapping carrier 150 to retain the lapping carrier in the vertical plane. Preferably, the holding force 160 is applied near the center of the contact pad arrangement, by means such as an air cylinder mechanism. The applied force 160 does not restrict movement of the lapping carrier 150 toward the lapping element 154 so that the wafer 152 can be brought into engagement with the lapping element 154 during the lapping procedure, but restricts movement of the carrier 150 away from the reference fixture 156 so as to substantially maintain the carrier in the vertical plane.

The reference fixture 156 is preferably mounted in such a manner so as to allow it to move vertically up and down, to thereby allow the reference fixture 156 and the lapping carrier 150 to move up and down to follow any changes in contour of the lapping element 154. Further, a vertically downward force is applied by suitable means (not shown) to the top of the lapping carrier 150, so as to force the lapping carrier 150 and the reference fixture 156 downward, to bring the wafer 152 into contact with the lapping element 154 to perform the lapping operation. The downward force applied to the lapping carrier 150 serves to maintain the wafer 152 in contact with the lapping element 154 during lapping, but does not prevent the reference fixture 156 and the lapping carrier 150 from moving vertically to follow the contour of the lapping element 154.

Thus, by applying the vertically downward force to the lapping carrier 150, the row of sliders is brought into contact with the lapping element 154, and the air bearing surfaces of the sliders can be lapped. As the contour of the lapping element 154 changes, the reference fixture 156 and the lapping carrier 150 move vertically together to follow the contour changes, thereby maintaining the sliders in contact with the lapping element.

This apparatus, however, cannot be used to produce a positive crown on the air bearing surfaces because the lapping carrier 150 is constrained to move in a vertical plane. Thus, the air bearing surfaces of the sliders are always oriented parallel to the surface of the lapping element 154, such that after lapping, the air bearing surfaces are always generally planar. Therefore, a separate crown adjust operation, such as sandblasting or laser machining, is generally required.

FIG. 4 depicts an improved apparatus 10 that can be used to produce a positive crown on the air bearing surfaces of a row of sliders, in accordance with the invention. The apparatus 10 is constructed similar to the apparatus of FIGS. 3A and 3B, in that the apparatus 10 includes a lapping carrier 12 which is designed to hold a wafer 14 comprising a matrix of individual slider units arranged in a plurality of rows and columns. The wafer 14 can contain any desirable number of horizontal rows and vertical columns of slider units, depending upon the size of the wafer and the size of the sliders. Preferably, the wafer includes forty four columns of slider units such that for each row, forty four slider units are processed at the same time. By processing a plurality of slider units at a time, increased productivity is obtained. However, a larger or smaller number of slider units in each row could be provided if desired.

The wafer 14 is held by the carrier 12 such that the air bearing surfaces of the sliders in the row to be processed face a lapping element 16, such as a lapping plate, a lapping tape and the like. The particular row to be lapped extends below the lapping carrier 12 to adjacent the top surface of the lapping element 16, which moves in the direction shown by the arrow in FIG. 4. It is of course apparent that the lapping element could move in the direction opposite that shown in FIG. 4, without changing the scope of the invention. The lapping carrier 12 is preferably actuatable vertically downward by suitable actuation means so that the wafer 14 can be brought into contact with the lapping element. The lapping carrier 12 is held against a vertical reference surface 17 of a reference fixture 18 in a generally vertical plane when the crown is not being produced. Like the apparatus shown in FIGS. 3A and 3B, the fixture 18 is preferably mounted in such a manner so as to allow it to move vertically up and down, so that the reference fixture 18 and the lapping carrier 12 can move up and down to follow any changes in contour of the lapping element 16.

The reference fixture 18 and the carrier 12 preferably move vertically together so that support for the carrier 12 is maintained. The fixture 18 can be any structure that is fixed relative to the carrier 12, i.e. moves vertically with the carrier, so long as the structure provides a vertical reference surface to allow the carrier 12 to be oriented in a vertical plane relative thereto. If the lapping element 16 is a circular lapping plate, the carrier 12 and fixture 18 are also preferably radially adjustable relative to the lapping plate so that the radius at which lapping occurs on the plate can be changed to allow even wearing of the lapping plate.

A plurality of contact pads 20, in the preferred case three pads, are connected to the backside of the lapping carrier 12 in a triangular arrangement, between the lapping carrier 12 and the reference fixture 18, similar to the arrangement shown in FIGS. 3A and 3B. A pair of lower contact pads 22 (only one pad being visible in FIG. 4) are connected to the reference surface 17 and are aligned with the two lower contact pads 20 on the backside of the lapping carrier 12, so that the lower contact pads 20, 22 are able to contact each other. The pads 20, 22 space the carrier 12 from the vertical reference surface 17.

A holding force 24 orthogonal to the plane of the triangle defined by the contact pads 20 is applied to the lapping carrier 12, near the center of the triangle defined by the contact pad 20 arrangement, to maintain the lapping carrier 12 in its vertical plane, but allowing the carrier 12 and the reference fixture 18 to move vertically so that the wafer 14 can be brought into engagement with the lapping element 16 and so that the carrier 12 and fixture 18 can follow changes in contour in the lapping element 16. The holding force 24 is applied by any suitable means, such as an air cylinder mechanism or the like.

The apparatus 10 so far described is similar to the apparatus shown in FIGS. 3A and 3B. However, in the apparatus 10, an actuator 26 is mounted on the fixture 18, in place of a top contact pad. The actuator 26 is displaceable back and forth, as shown by the double headed arrow 28, in a continuous and controllable fashion to contact the lapping carrier 12 and thereby cause the lapping carrier 12 to rotate back and forth about an axis A-A' defined by the contacting contact pads 20, 22, with the axis being generally parallel to the vertical plane.

This back and forth rotational movement of the lapping carrier allows the row of sliders on the wafer 14 to be lapped with a positive crown on their air bearing surfaces, without facet formation. The contact pads 20, 22, which are maintained in engagement by the holding force 24, form the pivot or rotation axis A-A' for the rotational movements of the carrier 12. Thus, when the carrier 12 is moved vertically downward into contact with the lapping element 16, clockwise rotation of the carrier 12 from the position shown in FIG. 4 causes the right side edge 15a of the wafer 14 to be lapped, while rotation in the counterclockwise direction from the position shown in FIG. 4 allows the left side edge 15b of the wafer to be lapped. This lapping of the right and left side edges 15a, 15b of the wafer produces a positive crown on each of the sliders in the row.

In use, upon displacement of the actuator 26 toward the carrier 12, a force is generated on the top pad 20 of the carrier 12. The force that is applied to the carrier 12 by the actuator 26 is located vertically above the holding force 24, and therefore the carrier will be rotated in a clockwise direction about the lower contact pads 20, 22 upon the application of a sufficient force to the carrier. The force that the actuator 26 needs to apply to overcome the holding force 24 can be determined by a simple moment analysis of the forces acting on the carrier 12.

Since the holding force 24 applies a counterclockwise moment to the carrier 12 about the axis A-A' of the lower contact pads 20, 22, the moment applied by the actuator 26 needs to be greater than the moment applied by the holding force 24 in order to achieve clockwise rotation of the carrier 12 about the axis A-A'. However, when the counterclockwise moment applied by the holding force 24 is greater than the clockwise moment applied by the actuator 26, the carrier 12 will be rotated in the counterclockwise direction about the axis A-A'. Therefore, by controlling the force applied by the actuator 26 to the carrier 12, the carrier can be rotated back and forth about the axis A-A' of the contact pads 20, 22. The force applied to the carrier 12 is caused by extension and retraction displacements of the actuator. In this manner, a continuous rotation of the carrier 12 in the vertical plane about the axis A-A' can be achieved, thereby producing a positive crown on the slider ABS.

The actuator 26 is preferably any type of electromechanical actuator, such as a piezo-electric actuator, a voice-coil actuator, a rotating cam shaft, etc. Power for operating the electromechanical actuator 26 is provided by a variable voltage power supply 30 electrically connected thereto in a suitable manner. By varying the voltage provided to the actuator 26, the amplitude of displacement of the actuator can be varied, thereby varying the rotational displacement of the lapping carrier and the resulting ABS crown that is produced. Thus, by controlling the voltage supplied the actuator 26, it is possible to select the desired ABS crown to meet a particular slider requirement.

For example, using a multi-layer piezo-electric having a size of 10 mm×10 mm×20 mm, it is possible to achieve an extension of 12 μm while generating a compression force on the top contact pad 20 of 3500 N at the operating voltage recommended by the manufacturer of the actuator. This extension displacement and generated force are sufficient to overcome the moment due to the holding force 24, so that the carrier 12 is rotated clockwise in the vertical plane. It has been found that a positive crown of 50 nm at the row can be achieved.

Figure 6:
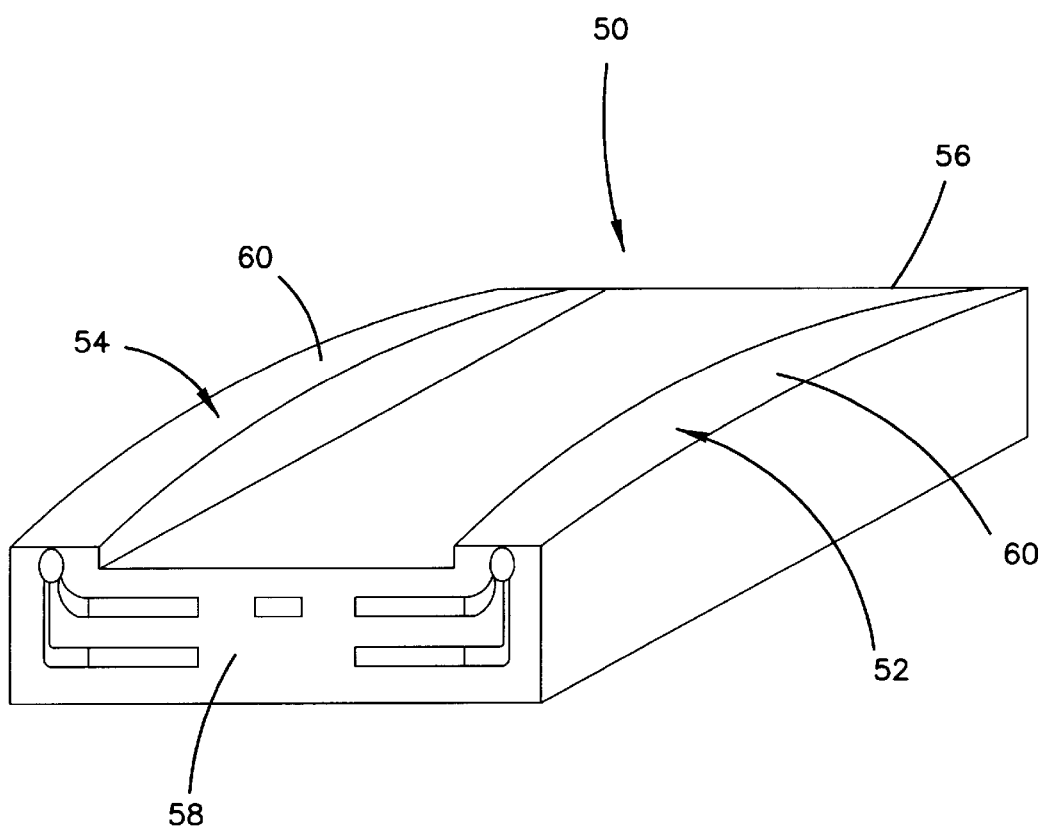
FIG. 6 is a detailed view of a slider having a positive crown produced thereon by the method of the invention.

FIG. 6 illustrates a slider 50 having a positive crown produced on air bearing surfaces 52, 54 thereof utilizing the method of the invention. The positive crowns are produced generally from the leading edge 56 of the slider 50 to the trailing edge 58 thereof, with an apex 60 of each crown located generally midway between the leading and trailing edges 56, 58 on each air bearing surface 52, 54. The positive crowns 60 produced on the air bearing surfaces 52, 54 improves the dynamic performance of the slider 50, such as by improving fly height and improving take-off performance, at the head/disk interface.

It is therefore apparent that the apparatus and process of the invention allow a positive ABS crown to be achieved during ABS lapping, thereby circumventing the need for crown adjust operations subsequent to ABS lapping. Further, the invention will permit the use of new slider materials that are not crown adjustable, such as many of the harder ceramic materials. While the lapping carrier -12 is shown and described as being held against the fixture 18 in a vertical plane, the carrier 12 could be held in other orientations as well, such as a horizontal orientation, as long as the plane of the carrier 12 and the reference surface 17 are parallel, and the plane of the lapping element 16 is perpendicular to the plane of the carrier 12.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for simultaneously producing a crown in each slider in a row of sliders comprising:
   a reference fixture having at least one contact pad;
   a carrier for holding the slider row, said carrier positioned adjacent said reference fixture and having at least two contact pads, one of which being engageable with a contact pad on the reference fixture; and
   a piezo-electric actuator affixed to the reference fixture engageable with a contact pad on said carrier for causing movement of the carrier relative to said reference fixture with extension and retraction displacement of the actuator.

2. An apparatus for simultaneously producing a crown in each slider in a row of sliders comprising;
   a reference fixture having at least one contact pad;
   a carrier for holding the slider row, said carrier positioned adjacent said reference fixture and having at least two contact pads, one of which being engageable with a contact pad on the reference fixture; and
   a voice coil actuator affixed to the reference fixture engageable with a contact pad on said carrier for causing movement of the carrier relative to said reference fixture with extension and retraction displacement of the actuator.

* * * * *